United States Patent
Nesargi et al.

(10) Patent No.: US 8,018,881 B2
(45) Date of Patent: Sep. 13, 2011

(54) ADMISSION CONTROL AND POLICING IN WIRELESS PACKET DATA COMMUNICATION SYSTEM

(75) Inventors: Sanket Nesargi, Richardson, TX (US); Jun Li, Richardson, TX (US); Kuntal Chowdhury, Plano, TX (US); Mini Vasudevan, Bangalore (IN)

(73) Assignee: Ericsson AB, Stockholm (SE)

( * ) Notice: Subject to any disclaimer, the term of this patent is extended or adjusted under 35 U.S.C. 154(b) by 967 days.

(21) Appl. No.: 11/632,819

(22) PCT Filed: Jul. 18, 2005

(86) PCT No.: PCT/US2005/025264
§ 371 (c)(1),
(2), (4) Date: Jan. 18, 2007

(87) PCT Pub. No.: WO2006/020105
PCT Pub. Date: Feb. 23, 2006

(65) Prior Publication Data
US 2007/0248080 A1 Oct. 25, 2007

Related U.S. Application Data

(60) Provisional application No. 60/589,062, filed on Jul. 19, 2004, provisional application No. 60/603,002, filed on Aug. 20, 2004.

(51) Int. Cl.
*H04B 7/00* (2006.01)
(52) U.S. Cl. ........ 370/310; 370/328; 370/329; 370/338; 455/452.2
(58) Field of Classification Search .............. 370/230, 370/231, 234, 235, 238, 252, 329, 338, 310, 370/328; 455/452.2
See application file for complete search history.

(56) References Cited

U.S. PATENT DOCUMENTS

| 2002/0181498 A1* | 12/2002 | Hsu et al. ............... 370/466 |
| 2004/0013089 A1 | 1/2004 | Taneja et al. |
| 2004/0042423 A1* | 3/2004 | Borella et al. ............ 370/328 |
| 2004/0062227 A1* | 4/2004 | Sayeedi .................... 370/350 |
| 2008/0298275 A1* | 12/2008 | De Sousa ................. 370/255 |

FOREIGN PATENT DOCUMENTS
WO   WO 02/058325 A2   7/2002

OTHER PUBLICATIONS

"Digital cellular telecommunications system (Phase 2+); Universal Mobile Telecommunications System (UMTS); General Packet Radio Service (GPRS) service description; Stage 2 (3GPP TS 23.060 version 5.8.0 Release 5)," ETSI TS 123 060, ETSI Standards, European Telecommunications Standards Institute, vol. 3-SA2, No. V580, Mar. 2004, pp. 1-211.

* cited by examiner

*Primary Examiner* — Nghi Ly
(74) *Attorney, Agent, or Firm* — Coats & Bennett, P.L.L.C.

(57) ABSTRACT

A call flow is provided in a wireless communication system to enable quality of service (QoS) parameters to be retrieved and provided to a base station when a wireless device requests service. The QoS parameters may include or represent a QoS profile associated with the wireless device, a QoS profile associated with a user of the wireless device, or a QoS policy for a session involving the wireless device. The base station uses the QoS parameters to control access to the system by the wireless device. Another call flow is provided to transfer the QoS parameters from the base station to a packet control function for storage when a packet data session associated with the wireless device becomes dormant. If the packet data session is later reactivated, the QoS parameters are provided from the packet control function back to the base station.

20 Claims, 4 Drawing Sheets

ADMISSION CONTROL AND POLICING IN WIRELESS PACKET DATA COMMUNICATION SYSTEM

CROSS REFERENCE TO RELATED APPLICATION(S)

This application claims the benefit of priority under 35 U.S.C. §119(e) of U.S. Provisional Application Nos. 60/589,062 filed Jul. 19, 2004 and 60/603,002 filed Aug. 20, 2004 and which are incorporated herein by reference.

TECHNICAL FIELD

This disclosure is directed generally to wireless communication systems and, more specifically, to a system and method for quality of service (QoS) parameter acquisition and maintenance.

BACKGROUND

Conventional wireless communication systems often need to ensure that different wireless devices receive appropriate levels of service. For example, different wireless devices may execute applications, provide services, or perform functions that require different quality of service (QoS) levels in a wireless communication system. As a particular example, a first wireless device may provide a voice service, while a second wireless device is executing a web browser application. In this example, the first wireless device providing the voice service may require higher bandwidth and less delay than the second device executing the web browser application. As a result, the first device may require a higher QoS level than the second device. The higher QoS level may result in the wireless communication system providing a higher guaranteed throughput level with a lower latency to the first device.

Information identifying one or more QoS levels to be provided to a particular wireless device or user is often referred to as a "QoS profile" for the wireless device or user. A single wireless device may execute multiple applications, perform multiple functions, or provide multiple services, each of which requires a data flow over a wireless interface. The QoS profile for the wireless device or user identifies the expected or desired and allowed QoS level for each of these data flows. Also, a QoS policy could be established and enforced in a wireless communication system, where the QoS policy controls or affects the QoS level(s) provided to a particular wireless device, user, or data flow.

In some wireless communication systems, a base station or access network is responsible for ensuring that service is provided to a wireless device at an appropriate QoS level. However, conventional base stations and access networks typically lack the ability to store and maintain QoS profiles and policies for various wireless devices. This often makes determining the QoS level provided to various wireless devices more complex and resource-intensive.

SUMMARY

This disclosure provides a system and method for quality of service (QoS) parameter acquisition and maintenance.

In one embodiment, a method includes receiving a request for service from a wireless device at a base station in a wireless communication system. The method also includes transmitting a message from the base station to a node in the wireless communication system for establishing a packet data session between the wireless device and the node. The method further includes receiving a quality of service parameter from the node in the wireless communication system. In addition, the method includes using the quality of service parameter to (i) determine whether an existing data flow associated with the wireless device violates the quality of service parameters, and/or (ii) admit an additional data flow associated with the wireless device in accordance with the quality of service parameter.

In a second embodiment, a base station includes a memory capable of storing a quality of service parameter. The base station also includes a controller capable of receiving the quality of service parameter from a node in the wireless communication system, where a packet data session is established between the wireless device and the node. The controller is also capable of using the quality of service parameter to (i) determine whether an existing data flow associated with the wireless device violates the quality of service parameter, and/or (ii) admit an additional data flow associated with the wireless device in accordance with the quality of service parameter.

In a third embodiment, a wireless communication system includes a packet data serving node capable of providing access to a packet data network and retrieving a quality of service parameter. The system also includes a base station capable of receiving a request for service from a wireless device. In addition, the system includes a packet control function capable of managing a relay of data between the base station and the packet data serving node. The packet control function is also capable of receiving the quality of service parameter from the packet data serving node and providing the quality of service parameter to the base station. The base station is capable of using the quality of service parameter to at least one of: (i) determine whether an existing data flow associated with the wireless device violates the quality of service parameter, and (ii) admitting an additional data flow associated with the wireless device in accordance with the quality of service parameter.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION OF EXAMPLE EMBODIMENTS

Figure 1:
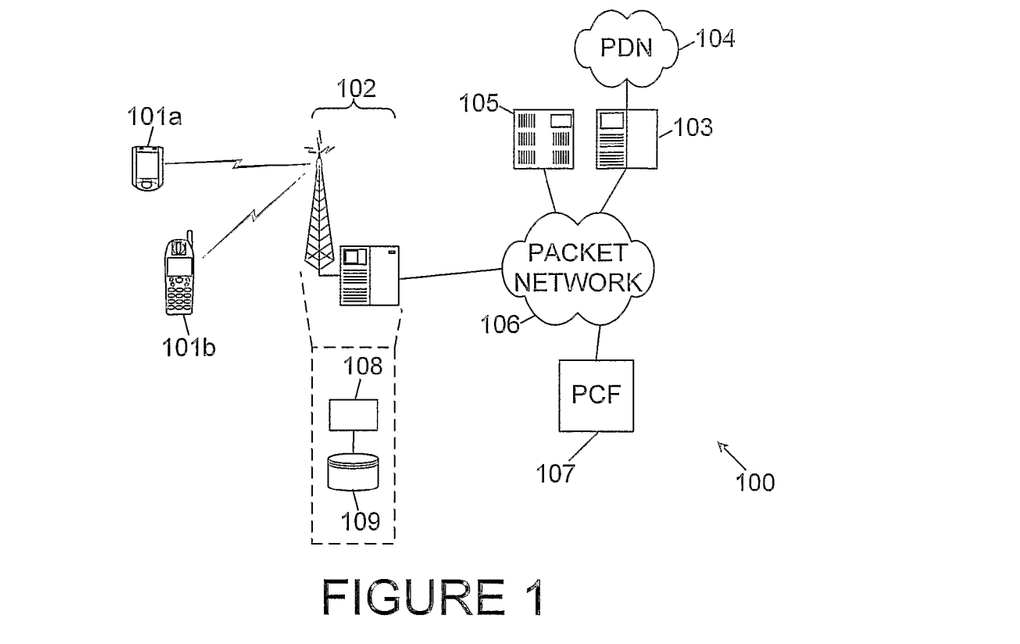
FIG. 1 illustrates an example wireless communication system supporting quality of service (QoS) parameter acquisition and maintenance according to one embodiment of this disclosure.

FIG. 1 illustrates an example wireless communication system 100 supporting quality of service (QoS) parameter acquisition and maintenance according to one embodiment of this disclosure. The embodiment of the system 100 shown in FIG. 1 is for illustration only. Other embodiments of the wireless communication system may be used without departing from the scope of this disclosure.

In this example, the system 100 includes wireless devices 101a-101b communicating with a base station 102 over wireless interfaces. The wireless devices 101a-101b represent any suitable communication devices capable of communicating over wireless interfaces. For example, the wireless devices 101a-101b could represent access terminals, mobile stations, personal digital assistants, portable computers, and the like. Each of the wireless devices 101a-101b includes hardware, software and/or firmware, or combination thereof, for communicating over a wireless interface.

The base station 102 is capable of communicating with the wireless devices 101a-101b over wireless interfaces. The base station 102 includes hardware, software and/or firmware, or combination thereof, for communicating with one or more wireless devices over wireless interfaces. The base station 102 could, for example, include a tower having one or more antennas mounted on the tower. In this document, the phrase "base station" includes and refers to base stations, access points, access networks, and the like.

A packet data serving node (PDSN) 103 provides access to an external packet data network (PDN) 104. For example, the packet data serving node 103 may function as a gateway to a public Internet Protocol (IP) network. The packet data serving node 103 may also function as an interface between the transmission of data in a packet data network and the transmission of data over the wireless interface. The packet data serving node 103 includes hardware, software and/or firmware, or combination thereof, for providing access to a packet data network.

An authentication, authorization, and accounting (AAA) server 105 (or other data server) provides various functions in the system 100. For example, the AAA server 105 performs authentication functions to authenticate the wireless devices 101a-101b. The AAA server 105 also authorizes requests for service and performs accounting functions to bill for service. In addition, the AAA server 105 stores quality of service or QoS profiles for the wireless devices 101a-101b or for individual users of the wireless devices 101a-101b. The AAA server 105 also stores any QoS policies for the system 100. As an example, a QoS profile includes information identifying one or more QoS levels that can be provided to a particular wireless device or a particular user. The AAA server 105 includes hardware, software and/or firmware, or combination thereof, for supporting authentication, authorization, or accounting functions in the system 100. In this document, the phrases "quality of service parameters" and "QoS parameters" refer to QoS parameters contained in a QoS profile, a QoS policy, or any other source.

A packet network 106 couples various components in the system 100. The packet network 106 represents any suitable network capable of transporting information between various ones of the base station 102, the packet data serving node 103, and the AAA server 105. The packet network 106 could, for example, represent a private or public IP network. In this document, the term "couple" and its derivatives refer to any direct or indirect communication between one or more components, whether or not those components are in physical contact with one another.

As shown in FIG. 1, a packet control function (PCF) 107 manages the relay of packets between the base station 102 and the packet data serving node 103. For example, the packet data serving node 103 may interface with the base station 102 through the packet control function 107. The packet control function 107 includes hardware, software and/or firmware, or combination thereof, for facilitating the relay of data between the base station 102 and the packet data serving node 103. The packet control function 107 could, for example, reside within a base station controller.

In some embodiments, the system 100 is implemented according to the Code Division Multiple Access 2000 (CDMA2000) specification. In particular embodiments, the system 100 represents a CDMA2000 1x wireless system or a CDMA2000 High Rate Packet Data (HRPD) or Data Optimized (DO) wireless system (also known as a CDMA2000 1xEV-DO network).

In the system 100, a single wireless device may operate using multiple data flows between the wireless device and the base station 102. For example, each of the data flows could be used to transport data for a different function, application, or service that is executed, implemented, or provided by the wireless device. In this document, the phrase "data flow" refers to a flow of associated user data to or from a wireless device for a particular function, application, or service.

The base station 102 in the system 100 is responsible for admitting new data flows into the system 100. A wireless device may request service (and therefore a new data flow) from the system 100, and part of the request may include a request for a particular QoS level. When the request for service is received, the base station 102 determines whether it has the resources needed to support the requested QoS level for the new data flow associated with the requested service. The base station 102 also ensures that the data flows associated with the wireless device do not exceed the QoS level that a user of the wireless device has subscribed to (such as when the user pays for a maximum QoS level). The base station 102 further ensures that the data flows associated with the wireless device do not exceed any QoS policies for the system 100. In addition, the base station 102 maps an acceptable new data flow to appropriate connections in the system 100. In the CDMA2000 environment, the base station 102 may map the new flow to an appropriate Radio Link Protocol (RLP) connection and to A8/A10 connections.

To support these functions, a call flow is provided in the system 100 to enable QoS parameters (such as a QoS profile or a QoS policy) to be retrieved and provided to the base station 102 when a wireless device requests service. Also, after a packet data session is established involving a wireless device and the wireless device begins receiving service in the system 100, the packet data session may go dormant. A call flow is provided in the system 100 to ensure that the QoS parameters are stored and made available for later use if the packet data session is reactivated.

As shown in FIG. 1, the base station 102 includes a controller 108 and a memory 109. In this example, the controller 108 functions for receiving and storing QoS parameters in the memory 109. The controller 108 may also be responsible for using the QoS parameters to determine whether data flows from the wireless devices should be admitted to the system 100. The controller 108 represents any suitable type of controller capable of using QoS parameters to manage data flows from wireless devices. The memory 109 represents any suitable volatile or non-volatile storage and retrieval device or devices.

In some embodiments, the functions of various components in the system 100 are implemented or supported by a computer program that is formed from computer readable program code and that is embodied in computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

Although FIG. 1 illustrates one example of a wireless communication system 100 supporting QoS parameter acquisition and maintenance, various changes may be made to FIG. 1. For example, the system 100 could include any number of wireless devices, base stations, packet data serving nodes, and packet networks.

Figure 2:
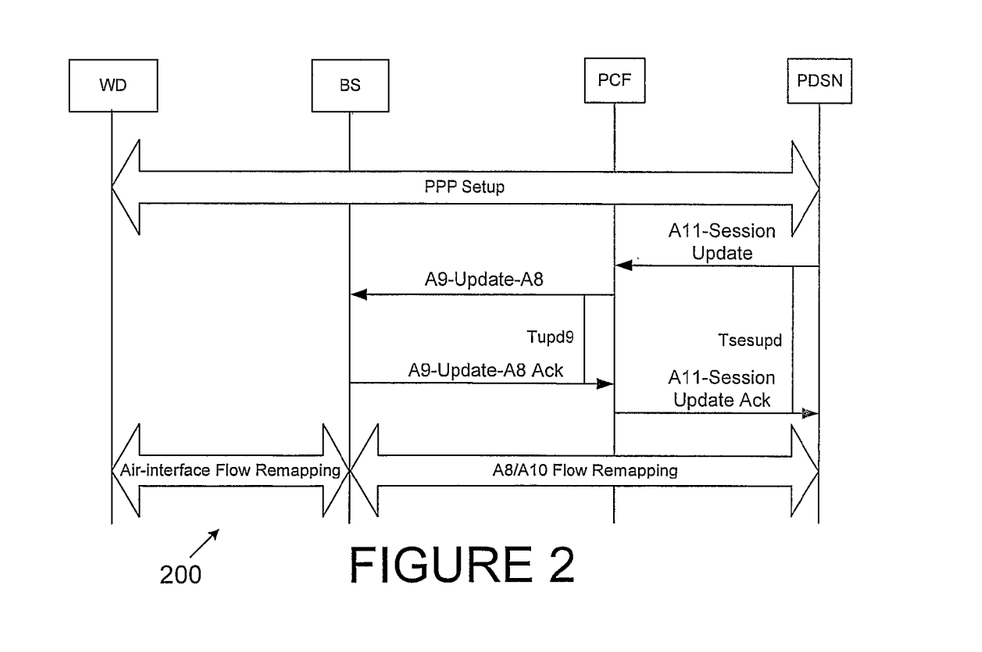
FIG. 2 illustrates an example message flow for transferring a QoS profile according to one embodiment of this disclosure.

FIG. 2 illustrates an example message (or data) flow 200 for transferring a QoS profile according to one embodiment of this disclosure. In particular, FIG. 2 illustrates an example message flow 200 involving a wireless device (WD), a base station (BS), a packet control function (PCF), and a packet data serving node (PDSN).

In this example, assume that the wireless device 101a is requesting service through the base station 102. The wireless device 101a may request service, for example, by attempting to initialize (or initiate) a packet data service instance. The phrase "service instance" refers to a connection between a wireless device and the packet data serving node 103 that is used to exchange data between the two components (and it includes "link flows" in a HRPD or DO wireless system). When the wireless device 101a initializes a first packet data service instance, a packet data session is started. The packet data session is associated with a point-to-point (PPP) session. For each packet data session, there is at least one service instance called the "main" service instance, which is used to negotiate the PPP session. Other service instances established after that (if any) are referred to as "auxiliary" service instances.

Once the PPP session is established, the wireless device 101a is ready to transmit and receive data packets (e.g., IP data packets). At this point, the wireless device 101a can only establish data flows over the main service instance. The base station 102 determines whether to admit those data flows from the wireless device 101a based on the wireless interface resources available at the base station 102. In order to establish auxiliary service instances to support other data flows, the base station 102 needs to obtain the QoS profile for the wireless device 101a or for a user associated with the wireless device 101a. The QoS profile for the wireless device 101a could, for example, be associated with the sessions involving the wireless device 101a.

To allow the base station 102 to obtain the QoS profile, after the PPP session is established, the packet data serving node 103 retrieves the QoS profile for the wireless device 101a (or for the user) from the AAA server 105. The packet data serving node 103 then generates an A11-Session Update message for the packet control function 107. The A11-Session Update message contains the QoS profile acquired by the packet data serving node 103. The packet data serving node 103 also starts a timer denoted $T_{sesupd}$.

Upon receiving the A11-Session Update message containing the QoS profile, the packet control function 107 generates an A9-Update-A8 message. The A9-Update-A8 message is used to transfer the QoS profile to the base station 102. The packet control function 107 also starts a timer denoted $T_{upd9}$. The base station 102 receives the QoS profile in the A9-Update-A8 message and acknowledges the receipt with an A9-Update-A8 Ack message. When the A9-Update-A8 Ack message is received, the packet control function 107 stops the timer $T_{upd9}$, and the packet control function 107 acknowledges the A11-Session Update message with an A11-Session Update Ack message. The packet data serving node 103 then stops the timer $T_{sesupd}$.

At this point, the base station 102 has obtained the QoS profile for the wireless device 101a (or for the user of the wireless device 101a). The base station 102 is then able to determine whether any existing data flows from the wireless device 101a exceed the QoS profile. If so, these flow(s) are released or remapped, thereby ensuring compliance with the received QoS profile.

In this example, the various timers $T_{sesupd}$ and $T_{upd9}$ may be used in any suitable manner. For example, the timers could be used to ensure that a QoS profile is provided to the base station 102 within a specified amount of time. If the base station 102 does not indicate receipt of the QoS profile, the packet data serving node 103 or the packet control function 107 may attempt to resend the QoS profile. Also, the base station 102 may be instructed to stop providing service to the wireless device 101a, or to take other action(s).

Figure 3:
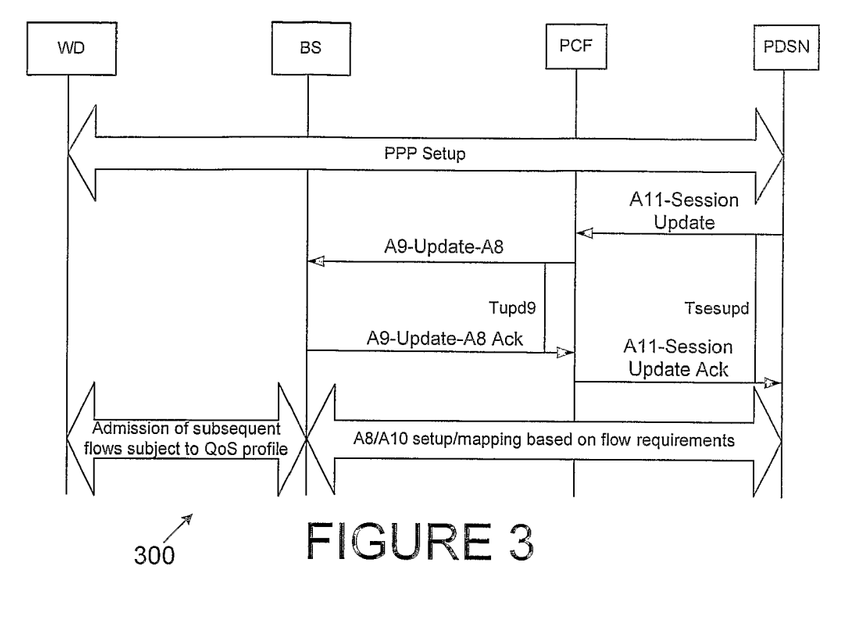
FIG. 3 illustrates another example message flow for transferring a QoS profile according to one embodiment of this disclosure.

FIG. 3 illustrates another example message flow 300 for transferring a QoS profile according to one embodiment of this disclosure. The message flow 300 shown in FIG. 3 is similar to the message flow 200 shown in FIG. 2. As shown in FIG. 3, after receiving the QoS profile at the base station 102, the base station 102 determines whether to admit or accept additional or subsequent data flows from the wireless device 101a. For example, the base station 102 may determine if the subsequent data flows violate the retrieved QoS profile. If not, the base station 102 may allocate to the new data flow a QoS level based on the current available wireless interface resources and the values in the QoS profile. In particular embodiments, the base station 102 allocates to the new data flow the best possible QoS level from a requested set of QoS levels in a QoS sub-block in the retrieved profile.

If subsequent data flows are accepted by the base station 102, the base station 102 informs the wireless device 101a of the QoS parameters selected by the base station 102. Also, A8/A10 connection mapping is performed for the new data flow so that a new A8/A10 connection may be created for the new data flow.

Figure 4:
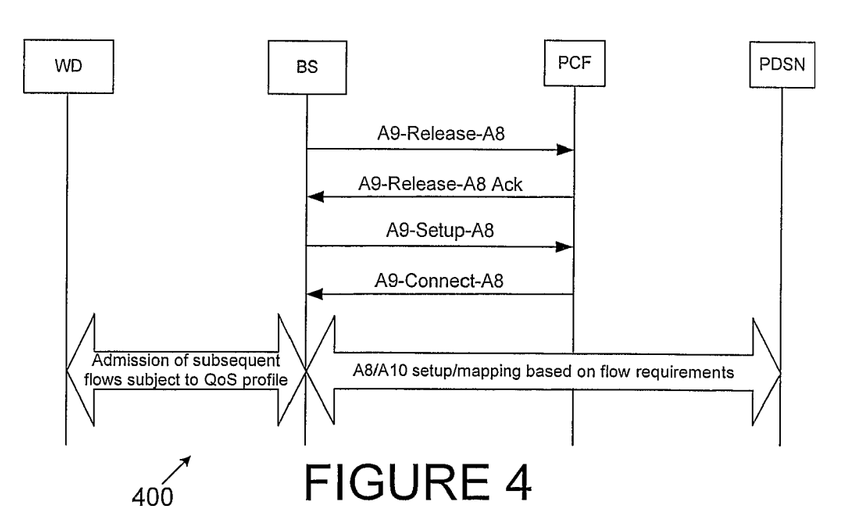
FIG. 4 illustrates an example message flow for storing a QoS profile for a wireless device according to one embodiment of this disclosure.

FIG. 4 illustrates an example message flow 400 for storing a QoS profile for a wireless device according to one embodiment of this disclosure. For ease of explanation, the message flow 400 is described with respect to the wireless device 101a receiving service from the base station 102.

The base station 102 may receive the QoS profile for the wireless device 101a or for a user associated with the wireless device 101a as described above with respect to FIGS. 2 and 3. A packet data session involving the wireless device 101a may later go dormant. This may occur, for example, when the last service instance for the wireless device 101a goes dormant, whether this is initiated by the wireless device 101a, the base station 102, or the packet data serving node 103. In general, a packet data session is dormant when all service instances are dormant and no physical traffic channel exists between the wireless device 101a and the base station 102, but the PPP session between the wireless device 101a and the packet data serving node 103 is maintained. When the packet data session goes dormant, the QoS profile for the wireless device 101*a* or for the user of the wireless device 101*a* may be lost at the base station 102.

The packet control function 107 (which terminates any A10 connections for the wireless device 101*a*) remains aware of the wireless device 101*a*. As a result, when a packet data session becomes dormant, the base station 102 transfers the QoS profile for the wireless device 101*a* or user to the packet control function 107 for storage. As shown in FIG. 4, when a service instance goes dormant, an A9-Release-A8 message is sent from the base station 102 to the packet control function 107 to initiate a release of the corresponding A8 connection. The A9-Release-A8 message includes the requested and granted QoS parameters for each data flow mapped to the service instance going dormant. If the A9-Release-A8 message is initiated for the last active service instance in a packet data session for the wireless device 101*a*, the base station 102 also includes the QoS profile associated with the wireless device 101*a* or user in this message. When the packet control function 107 receives the A9-Release-A8 message containing the QoS profile, the QoS profile is stored at the packet control function 107 for the duration of the packet data session dormancy.

If and when the packet data session becomes active again (when the first service instance becomes active), the packet control function 107 transfers the QoS profile for the wireless device 101*a* or user back to the base station 102. When a packet data service instance needs to be re-activated (whether initiated by the wireless device 101*a* or the packet data serving node 103), the base station 102 generates an A9-Setup-A8 message for the corresponding service instance. The packet control function 107 receives the A9-Setup-A8 message and responds with an A9-Connect-A8 message that establishes an A8 connection. The A9-Connect-A8 message also includes the QoS parameters for all data flows mapped to the dormant service instance being reactivated.

The packet control function 107 also determines if the A8 connection being activated transitions a packet data session from dormant to active. In other words, the packet control function 107 determines if this is the first service instance in a dormant packet data session to be reactivated. If so, the packet control function 107 includes the QoS profile corresponding to the wireless device 101*a* or the user in the A9-Connect-A8 message. This QoS profile is received and stored at the base station 102, allowing the base station 102 to once again use the QoS profile for admission control of subsequent data flows.

In this way, the QoS profile of a wireless device 101*a* is stored at the packet control function 107 and may be easily restored to the base station 102 when the wireless station 101*a* becomes active again. The base station 102 need not wait for the packet data serving node 103 to retrieve the QoS profile from the AAA server 105 again.

Figure 5:
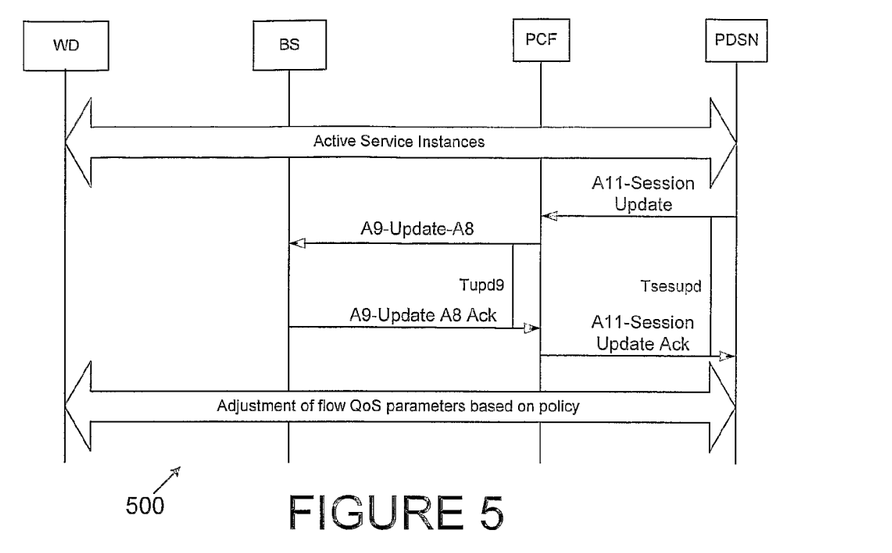
FIG. 5 illustrates an example message flow for transferring a QoS policy according to one embodiment of this disclosure.

FIG. 5 illustrates an example message flow 500 for transferring a QoS policy according to one embodiment of this disclosure. In some embodiments, a policy may be established controlling assignment of QoS levels to users or wireless devices in the system 100. The message flow 500 is used to provide the QoS policy to the base station 102 for use.

As an example, a request for service could represent a request for a multimedia domain (MMD) service. A data flow for the MMD service is mapped to an active service instance. However, a Service Based Bearer Control (SBBC) policy could be enabled in the system 100. The SBBC policy governs the maximum QoS parameters that can be supported for a particular MMD data flow, and the policy-based QoS parameters may need to be provided to the base station 102. In this case, the packet data serving node 103 retrieves the SBBC policy from the AAA server 105. The packet data serving node 103 then generates and transmits an A11-Session Update message containing the SBBC policy parameters to the packet control function 107, and the timer $T_{sesupd}$ is started at the packet data serving node 103.

Upon receiving the A11-Session Update message containing the SBBC policy parameters, the packet control function 107 generates an A9-Update-A8 message to transfer the policy parameters to the base station 102. The packet control function 107 also starts the timer $T_{upd9}$. The base station 102 acknowledges the receipt of the SBBC policy parameters with an A9-Update-A8 Ack message, and the timer $T_{upd9}$ is stopped at the packet control function 107. The packet control function 107 acknowledges the A11-Session Update message with an A11-Session Update Ack message upon receiving the A9-Update-A8 Ack from the base station 102. The packet data serving node 103 then stops the timer $T_{sesupd}$.

At this point, the base station 102 has successfully received the QoS parameters for a policy in the system 100. The base station 102 may then adjust any granted QoS parameters for one or more data flows to conform the data flows to the policy. For example, the base station 102 may adjust the QoS parameters of a MMD data flow to conform the data flow to the SBBC policy.

As shown in FIGS. 2 through 5, various message flows have been provided to allow a base station to retrieve and enforce QoS profiles and QoS policies. A message flow has also been provided to allow the base station to store a previously retrieved QoS profile. In some embodiments, the various components in the system 100 maintain the following information to support these message flows:

Base station: Identifiers for data flows, and QoS parameters requested by wireless devices and QoS parameters granted to wireless devices for data flows mapped to active RLP connections;

Packet control function: Identifiers for data flows, and QoS parameters requested by wireless devices and QoS parameters granted to wireless devices for data flows mapped to dormant service instances; and Packet data serving node: Identifiers for data flows, and QoS parameters granted to wireless devices for data flows mapped to both active and dormant service instances.

Although FIGS. 2 through 5 illustrate various message flows for transferring QoS parameters in a wireless communication system 100, various changes or modifications may be made to FIGS. 2 through 5. For example, different timers could be used in the wireless communication system 100, or the timers could be omitted.

Figure 6:
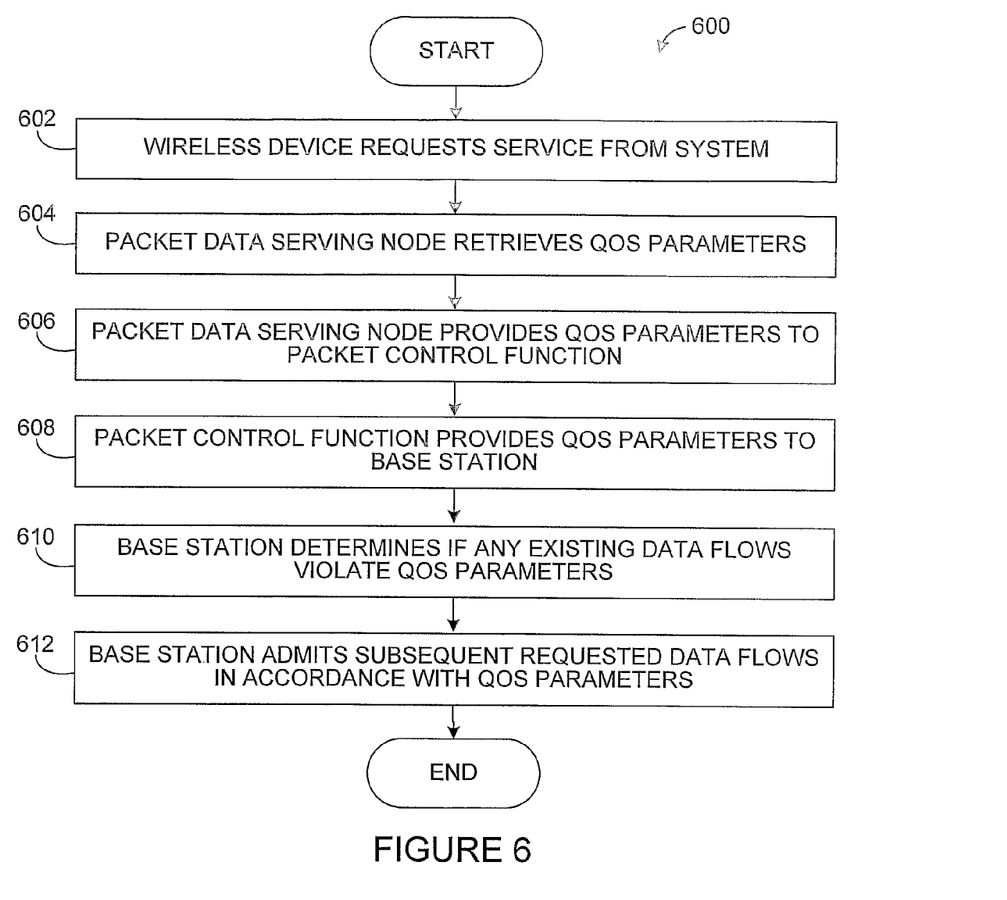
FIGS. 6 and 7 illustrate example methods for QoS parameter acquisition and maintenance according to one embodiment of this disclosure.
Figure 7:
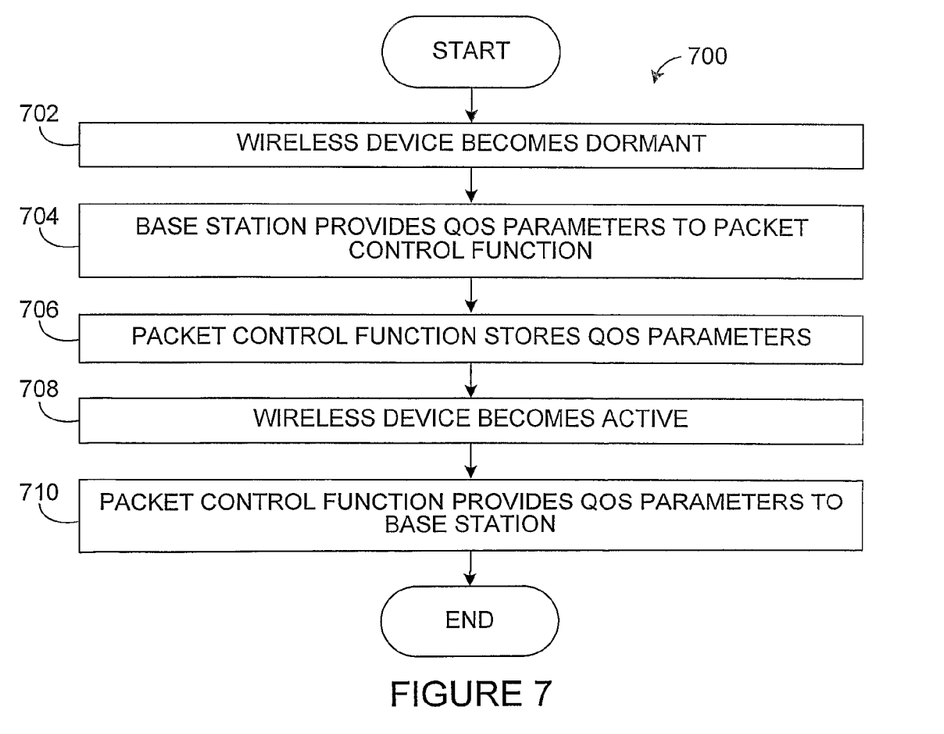

FIGS. 6 and 7 illustrate example methods 600, 700 for QoS parameter acquisition and maintenance according to one embodiment of this disclosure. For ease of explanation, the methods 600, 700 are described with respect to the system 100 of FIG. 1. The methods 600, 700 could be used in any other suitable system.

In FIG. 6, a wireless device 101*a* requests service from a wireless communication system 100 at step 602. This may include the wireless device 101*a* communicating a request for service identifying the type of service and the desired QoS level for that service. The request could take the form of an attempt by the wireless device 101*a* to initialize (or initiate) a packet data service instance.

A packet data serving node 103 retrieves QoS parameters at step 604. This may include the packet data serving node 103 retrieving a QoS profile for the wireless device 101*a* or a user associated with the wireless device 101*a* from the AAA server 105. This may also include the packet data serving node 103 retrieving a QoS policy, such as a SBBC policy, from the AAA server 105.

The packet data serving node 103 provides the retrieved QoS parameters to the packet control function 107 at step 606. These parameters may include the QoS profile or policy information. The packet control function 107 provides the retrieved QoS parameters to the base station 102 at step 608.

The base station 102 uses the retrieved QoS parameters to determine if any existing data flows violate the QoS parameters at step 610. This may include the base station 102 releasing or remapping any data flows that violate the QoS parameters. The base station 102 also uses the retrieved QoS parameters to admit subsequent data flows at step 612. This may include the base station 102 admitting new data flows in accordance with the QoS parameters.

In FIG. 7, the wireless device 101a becomes dormant at step 702. This may include the last service instance used by the wireless device 101a becoming dormant. The base station 102 then provides the QoS parameters for that wireless device 101a to the packet control function 107 at step 704. The packet control function 107 stores the QoS parameters at step 706.

At a later point in time, the wireless device 101a becomes active again at step 708. This may include a service instance used by the wireless device 101a becoming active. The packet control function 107 retrieves and provides the QoS parameters for that wireless device 101a to the base station 102 at step 710.

Although FIGS. 6 and 7 illustrate example methods 600, 700 for QoS parameter acquisition and maintenance, various changes may be made to FIGS. 6 and 7. For example, the methods 600, 700 could be used independent of one another in a system. In other words, the system may support method 600 without supporting method 700, and vice versa.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The terms "processor" and "controller" mean any device, system or part thereof that controls at least one operation, such a device may be implemented in hardware, firmware or software, or some combination of at least two of the same. It should be noted that the functionality associated with any particular processor or controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   receiving a request for service from a wireless device at a base station in a wireless communication system;
   transmitting a message from the base station to a node in the wireless communication system for establishing a packet data session between the wireless device and the node;
   receiving a quality of service parameter from the node in the wireless communication system;
   transmitting the quality of service parameter from the base station to a packet control function in the wireless communication system when the packet data session becomes dormant; and
   receiving the quality of service parameter from the packet control function when the packet data session is reactivated.

2. The method of claim 1, wherein:
   the node comprises a packet data serving node capable of providing access to a packet data network.

3. The method of claim 2, wherein receiving the quality of service parameter comprises:
   receiving the quality of service parameter from the packet control function in the wireless communication system, the packet control function capable of receiving the quality of service parameter from the packet data serving node.

4. The method of claim 3, wherein:
   the packet data serving node is capable of retrieving the quality of service parameter from a server in the wireless communication system.

5. The method of claim 1, further comprising: using the quality of service parameter to at least one of:
   determine whether an existing data flow associated with the wireless device violates the quality of service parameter; and
   admit an additional data flow associated with the wireless device in accordance with the quality of service parameter.

6. The method of claim 1, wherein the packet control function is located in a base station controller.

7. The method of claim 5, wherein:
   the packet data session is established when the wireless device initializes a first packet data service instance, the first packet data service instance initialized before the base station receives the quality of service parameter;
   the first packet data service instance is used to negotiate a point-to-point protocol session between the wireless device and the node;
   the existing data flow is established using the first packet data service instance; and
   the additional data flow is established using a second packet data service instance, the second packet data service instance initialized after the base station receives the quality of service parameter.

8. The method of claim 1, wherein the quality of service parameter comprises at least one of:
   a quality of service profile associated with the wireless device;
   a quality of service profile associated with a user of the wireless device; and
   a quality of service policy.

9. The method of claim 8, wherein
   at least one of the quality of service profiles comprises an allowed value of the quality of service parameter; and
   the quality of service policy comprises a policy associated with a Service Based Bearer Control (SBBC) session.

10. The method of claim 1, wherein the wireless communication system comprises one of: a Code Division Multiple Access 2000 (CDMA2000) lx wireless system and a CDMA2000 High Rate Packet Data (HRPD) wireless system.

11. A base station, comprising:
a memory capable of storing a quality of service parameter; and
a controller capable of:
receiving the quality of service parameter from a node in a wireless communication system, a packet data session established between a wireless device and the node;
transmitting the quality of service parameter to a packet control function when the packet data session becomes dormant; and
receiving the quality of service parameter from the packet control function when the packet data session is reactivated.

12. The base station of claim 11, wherein:
the node comprises a packet data serving node capable of providing access to a packet data network; and
the controller is capable of receiving the quality of service parameter from the packet control function in the wireless communication system, the packet control function capable of receiving the quality of service parameter from the packet data serving node.

13. The base station of claim 12, wherein the controller is further capable of: using the quality of service parameter to at least one of:
determine whether an existing data flow associated with the wireless device violates the quality of service parameter, and
admit an additional data flow associated with the wireless device in accordance with the quality of service parameter.

14. The base station of claim 12, wherein:
the packet data session is associated with a point-to-point protocol session between the wireless device and the packet data serving node;
the packet data session becomes dormant when all service instances associated with the packet data session are dormant and the point-to-point protocol session is maintained; and
the packet data session is reactivated when at least one service instance associated with the packet data session is reactivated.

15. The base station of claim 13, wherein:
the packet data session is established when the wireless device initializes a first packet data service instance, the first packet data service instance initialized before the base station receives the quality of service parameter;
the first packet data service instance is used to negotiate a point-to-point protocol session between the wireless device and the node;
the existing data flow is established using the first packet data service instance; and the additional data flow is established using a second packet data service instance, the second packet data service instance initialized after the base station receives the quality of service parameter.

16. The base station of claim 11, wherein the quality of service parameter comprises at least one of:
a quality of service profile associated with the wireless device;
a quality of service profile associated with a user of the wireless device; and
a quality of service policy.

17. The base station of claim 11, wherein the wireless communication system comprises one of: a Code Division Multiple Access 2000 (CDMA2000) 1x wireless system and a CDMA2000 High Rate Packet Data (HRPD) wireless system.

18. A wireless communication system, comprising:
a packet data serving node capable of providing access to a packet data network and retrieving a quality of service parameter;
a base station capable of receiving a request for service from a wireless device; and
a packet control function capable of managing a relay of data between the base station and the packet data serving node, the packet control function also capable of receiving the quality of service parameter from the packet data serving node and providing the quality of service parameter to the base station;
wherein the base station is further capable of transmitting the quality of service parameter to the packet control function for storage when a packet data session associated with the wireless device becomes dormant; and
wherein the packet control function is capable of transmitting the quality of service parameter to the base station when the packet data session is reactivated.

19. The wireless communication system of claim 18, wherein the base station is capable of using the quality of service parameter to at least one of:
determine whether an existing data flow associated with the wireless device violates the quality of service parameter, and
admitting an additional data flow associated with the wireless device in accordance with the quality of service parameter.

20. The wireless communication system of claim 18, wherein the quality of service parameter comprises at least one of:
a quality of service profile associated with the wireless device;
a quality of service profile associated with a user of the wireless device; and
a quality of service policy.

* * * * *